(12) United States Patent
O'Shea et al.

(10) Patent No.: US 10,429,486 B1
(45) Date of Patent: Oct. 1, 2019

(54) METHOD AND SYSTEM FOR LEARNED COMMUNICATIONS SIGNAL SHAPING

(71) Applicant: DeepSig Inc., Arlington, VA (US)

(72) Inventors: Timothy James O'Shea, Arlington, VA (US); James Shea, Arlington, VA (US); Ben Hilburn, Arlington, VA (US)

(73) Assignee: DeepSig Inc., Arlington, VA (US)

( * ) Notice: Subject to any disclaimer, the term of this patent is extended or adjusted under 35 U.S.C. 154(b) by 0 days.

(21) Appl. No.: 15/998,986

(22) Filed: Aug. 20, 2018

Related U.S. Application Data

(60) Provisional application No. 62/547,234, filed on Aug. 18, 2017.

(51) Int. Cl.
| | |
|---|---|
| G01S 5/00 | (2006.01) |
| G01S 5/02 | (2010.01) |
| G01S 11/06 | (2006.01) |
| G06N 20/00 | (2019.01) |

(52) U.S. Cl.
CPC ............ G01S 5/0268 (2013.01); G01S 5/021 (2013.01); G01S 5/0215 (2013.01); G01S 11/06 (2013.01); G06N 20/00 (2019.01)

(58) Field of Classification Search
CPC ...... G01S 5/0268; G01S 5/021; G01S 5/0215; G01S 11/06; G06N 20/00
See application file for complete search history.

(56) References Cited

U.S. PATENT DOCUMENTS

| | | | | |
|---|---|---|---|---|
| 2007/0105576 A1* | 5/2007 | Gupta | ................. | H04W 52/243 455/509 |
| 2018/0322388 A1* | 11/2018 | O'Shea | ..................... | G06N 3/08 |
| 2018/0367192 A1* | 12/2018 | O'Shea | ................ | H04B 7/0452 |

\* cited by examiner

*Primary Examiner* — Khai M Nguyen
(74) *Attorney, Agent, or Firm* — Fish & Richardson P.C.

(57) ABSTRACT

Methods and systems including computer programs encoded on computer storage media, for training and deploying machine-learned communication over radio frequency (RF) channels. One of the methods includes: determining first information; generating a first RF signal by processing using an encoder machine-learning network; determining a second RF signal that represents the first RF signal altered by transmission through a communication channel; determining a first property of the first signal or the second RF signal; calculating a first measure of distance between a target value of the first property and an actual value of the first or second RF signal; generating second information as a reconstruction of the first information using a decoder machine-learning network; calculating a second measure of distance between the first information and the second information; and updating at least one of the encoder machine-learning network or the decoder machine-learning network based on the first and second measures.

20 Claims, 9 Drawing Sheets

METHOD AND SYSTEM FOR LEARNED COMMUNICATIONS SIGNAL SHAPING

CROSS-REFERENCE TO RELATED APPLICATION

This application claims priority to U.S. Provisional Application No. 62/547,234, filed on Aug. 18, 2017. The disclosure of this prior application is considered part of and is incorporated by reference in the disclosure of this application.

TECHNICAL FIELD

The present disclosure relates to machine learning and deployment of adaptive wireless communications, and in particular, for learned communications signal shaping for radio frequency (RF) signals.

BACKGROUND

Signal waveforms are prevalent in many systems for communication, storage, sensing, measurements, and monitoring. In some cases, various waveforms, such as RF waveforms, acoustic waveforms, or optical waveforms, are transmitted and received through various types of communication media, such as over the air, under water, or through outer space. In some scenarios, RF waveforms transmit information that is modulated onto one or more carrier waveforms operating at RF frequencies. In other scenarios, RF waveforms are themselves information, such as outputs of sensors or probes. Information that is carried in RF waveforms is typically processed, stored, and/or transported through other forms of communication, such as through an internal system bus in a computer or through local or wide-area networks.

SUMMARY

In general, the subject matter described in this disclosure can be embodied in methods, apparatuses, and systems for training and deploying machine-learning networks to communicate over RF channels, and specifically to encode and decode information for learned communications signal shaping for communication over RF channels. In some cases, the RF channels communicate RF signals with specific waveform properties, shapes, or behaviors, or any suitable combination of these.

According to one aspect of the subject matter described in this application, a method is performed by one or more processor configured to train one or more machine-learning networks to process information transmitted through a communication channel. The method includes determining first information for transmission through a communication channel; generating a first RF signal for transmission through the communication channel by processing the first information using an encoder machine-learning network; determining a second RF signal that represents the first RF signal having been altered by transmission through the communication channel; determining a first property of at least one of the first RF signal or the second RF signal; calculating a first measure of distance between a target value of the first property and an actual value of at least one of the first RF signal or the second RF signal generating second information as a reconstruction of the first information by processing the second RF signal using a decoder machine-learning network; calculating a second measure of distance between the first information and the second information; and updating at least one of the encoder machine-learning network or the decoder machine-learning network based on (i) the first measure of distance between the actual value and the target value of the first property and (ii) the second measure of distance between the first information and the second information.

The process of updating at least one of the encoder machine-learning network or the decoder machine-learning network includes: determining an objective function including the first measure of distance and the second measure of distance; calculating a rate of change of the objective function relative to variations in at least one of the encoder machine-learning network or the decoder machine-learning network; and determining a goal value of the objective function by using the rate of change of the objective function relative to the variations in at least one of the encoder machine-learning network or the decoder machine-learning network. The goal value corresponds to a value that is within a predetermined range from a minimum of the objective function.

Implementations according to this aspect may include one or more of the following features. For example, the process of updating at least one of the encoder machine-learning network or the decoder machine-learning network may further include determining at least one of a first weight of the encoder machine-learning network or a second weight of the decoder machine-learning network, where the first weight or the second weight enables the objective function to achieve the goal value. In some examples, the process of determining at least one of the first weight of the encoder machine-learning network or the second weight of the decoder machine-learning network includes determining at least one of the first weight of the encoder machine-learning network or the second weight of the decoder machine-learning network to achieve (i) at least one of a first value that is within a predetermined range from a maximum value or a minimum value of the first measure of distance and (ii) a second value that is within a predetermined range from a minimum value of the second measure of distance.

In some implementations, the updating results in a value of the first measure of distance below or above a first predetermined threshold, and a value of the second measure of distance below a second predetermined threshold. In some examples, the first property includes a target spectral shape of at least one of the first RF signal or the second RF signal, and the process of calculating the first measure of distance includes determining a shaping distance metric that represents a difference between the target spectral shape and a spectral shape of at least one of the first RF signal or the second RF signal. For example, the process of determining the shaping distance metric may include calculating (i) a summation of squared differences between the spectral shape of the first RF signal and the target spectral shape of the first RF signal, or (ii) a summation of squared differences between the target spectral shape of the first RF signal and a maximum among the spectral shape of the first RF signal and a preset threshold value.

In some implementations, the process of determining the first property of at least one of the first RF signal or the second RF signal includes using a known RF processing module to process at least one of the first RF signal or the second RF signal, and the process of calculating the first measure of distance includes determining an output of at least one of the first RF signal or the second RF signal from the known RF processing module as the first measure of distance. For instance, the first measure of distance comprises a probability of detection of at least one of (i) a power level of the first RF signal or the second RF signal, (ii) a probability of correct classification of the first RF signal or the second RF signal, (iii) a strength of a moment, correlation, cumulant, or signature of the first RF signal or the second RF signal, (iv) a frequency of the first RF signal or the second RF signal, or (v) a cyclostationary property of the first RF signal or the second RF signal.

In some implementations, the known RF processing module includes a learned machine-learning network configured to process at least one of the first RF signal or the second RF signal, In such implementations, the process of calculating the first measure of distance may include determining a plurality of outputs of at least one of the first RF signal or the second RF signal from the learned machine-learning network, and determining a first output of the plurality of outputs as the first measure of distance and a second output of the plurality of outputs as a third measure of distance that represents a second property of the first RF signal, wherein the second property is different from the first property of the first RF signal or the second RF signal. In some examples, the process of determining the objective function including the first measure of distance and the second measure of distance includes determining a second objective function including the first measure of distance, the second measure of distance, and the third measure of distance.

In some implementations, the process of updating at least one of the encoder machine-learning network or the decoder machine-learning network further includes determining at least one of a first weight of the encoder machine-learning network or a second weight of the decoder machine-learning network to achieve one or more of (i) a first goal value of the first measure of distance, (ii) a second goal value of the second measure of distance, and (iii) a third goal value of the third measure of distance. In such implementations, the first, second, and third goal values correspond to a value of the second objective function that is within a predetermined range from a minimum of the second objective function.

In some implementations, the second measure of distance between the second information and the first information includes at least one of (i) a cross-entropy between the second information and the first information, (ii) a geometric distance metric between the second information and the first information, or (iii) an f-divergence between the second information and the first information.

In some implementations, the communication channel includes at least one of a radio communication channel, an acoustic communication channel, an optical communication channel, or a simulated model channel corresponding to a radio communication channel, an acoustic communication channel, or an optical communication channel.

In some implementations, the process of training the at least one machine-learning network includes one of training, using a transmitter device in a communications system that includes the communication channel, the encoder machine-learning network, and the decoder machine-learning network, or training, using a receiver device in the communications system, the encoder machine-learning network, and the decoder machine-learning network.

Other implementations of the above and other aspects include corresponding systems, apparatuses, and computer programs, configured to perform the actions of the above methods, encoded on computer storage devices. A system of one or more computers can be so configured by virtue of software, firmware, hardware, or a combination of them installed on the system that in operation cause the system to perform the above-described actions. One or more computer programs can be so configured by virtue of having instructions that, when executed by data processing apparatus, cause the apparatus to perform the above-described actions.

All or part of the features described throughout this application can be implemented as a computer program product including instructions that are stored on one or more non-transitory machine-readable storage media, and that are executable on one or more processing devices. All or part of the features described throughout this application can be implemented as an apparatus, method, or electronic system that can include one or more processing devices and memory to store executable instructions to implement the stated functions.

The details of one or more implementations of the subject matter of this disclosure are set forth in the accompanying drawings and the description below. Other features, aspects, and advantages of the subject matter will become apparent from the description, the drawings, and the claims.

BRIEF DESCRIPTION OF THE DRAWINGS

Like reference symbols in the various drawings indicate like elements.

DETAILED DESCRIPTION

Figure 1:
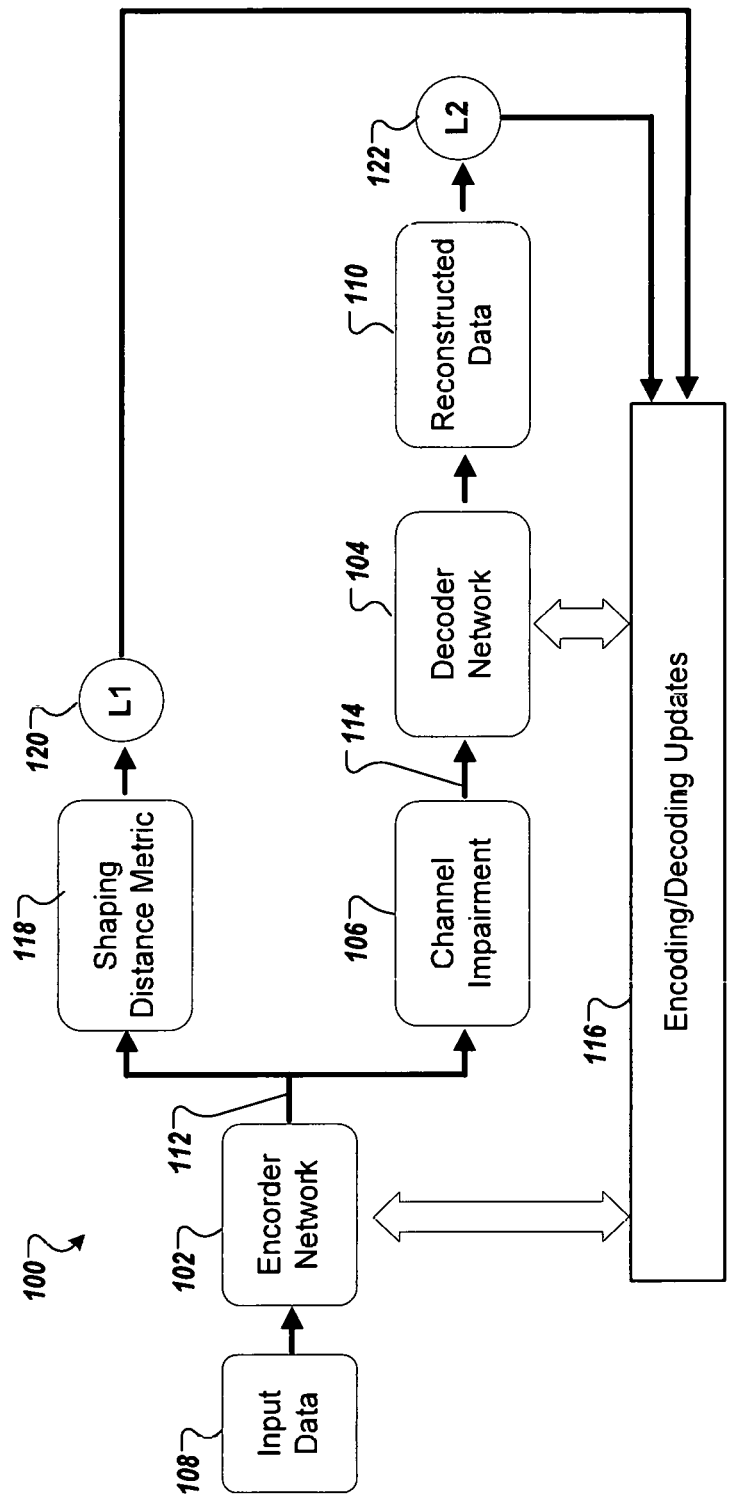
FIG. 1 illustrates an example of a radio frequency (RF) system that updates machine-learning encoder and decoder networks using two loss functions that include a shaping distance metric.

Systems and techniques are disclosed herein that enable machine learning and deployment of communication over an impaired RF channel. In some implementations, at least one machine-learning network is trained to encode information as a signal that is transmitted over a radio transmission channel, and to decode a received signal to recover the original information. The training may be designed to achieve various criteria such a low bit error rate, high power, low power, narrow bandwidth, wide bandwidth, high complexity, low complexity, high detectability, low detectability, low vulnerability to radio jamming, performing well in particular regimes such as at a low signal to noise (SNR) ratio or under specific types of fading or interference, similarity to pre-existing signal shapes or structure, and/or other criteria. The results of training such machine-learning networks may then be utilized to deploy real-world encoders and decoders in communication scenarios to encode and decode information over various types of RF, acoustic, or optical communication media. In some implementations, further learning and adaptation of the encoder and decoder may be implemented during deployment, based on feedback information, for example to further improve performance metrics based on in-situ information and distributions from the deployed location. These encoders and decoders may replace or augment one or more signal processing functions such as modulation, demodulation, mapping, error correction, or other components which exist in similar communications systems today.

In RF communication systems, signal modulation and encoding may result in a signal shaping of RF signals, or the presence of distinctive signatures, features or structure. For example, a spectral shape of an RF signal may be different from a spectral shape of a modulated RF signal when the RF signal is encoded/modulated using an encoding scheme. In some examples, selection processes for signal modulation and encoding schemes are influenced by pre-defined standard modulation schemes, regulatory rules such as spectral power masks, or cost of hardware components that implement modulation of RF signals. The pre-defined standard modulation schemes may provide an insufficient modulation performance considering the various criteria discussed above. In some cases, to minimize interference with an adjacent carrier RF signal, an RF communications system may use pulse shaping filters such as finite impulse response filters having a root-raised cosine filter design or analog filters designed for specific frequency responses. The pulse shaping filters and the analog filters may define a roll-off shape of an RF signal at the edges in the frequency domain.

In some implementations, the selection process for physical layer modulation schemes (e.g., signal encoding schemes) can be learned from communications through channel impairment models using an autoencoder (or an equivalent of the autoencoder) which uses gradient estimation over the communications. For example, the autoencoder may train encoder or decoder machine-learning networks utilizing information included in a transmitted RF signal and a received RF signal that corresponds to the transmitted RF signal having been altered by transmission through a communication channel or an analytic model of the communication channel. In one example, the autoencoder seeks a weight or connectivity scheme of machine-learning layers included in one or both of the encoder and decoder networks to minimize a loss of information through the communication channel. In this case, the RF communication system may learn an optimal physical layer modulation scheme from results of transmission through the communication channel impairment.

In some examples, while learning an optimal physical layer modulation scheme, the RF communication system may determine spectral shapes or other appearances of an RF signal for a wide range of target properties. In the same or other examples, the RF communication system may select a physical layer modulation scheme from among learned physical layer modulation schemes to achieve a spectral shape of an RF signal for the wide range of target properties. For example, the target properties include a range of power of a modulated RF signal between certain levels (e.g., from peak to average power), a range of spectrum of the modulated RF signal, a bandwidth of the modulated RF signal, a target spectral mask, or a frequency shape desired for the modulated RF signal.

In some examples, the target properties may be determined using one more outputs of a known or learned signal processing module configured to process RF signals. The known processing module may include one or more known algorithms that can process RF signals to output actual values derived from the RF signals corresponding to the target properties (e.g. detection, classification, localization, symbol estimation, regression, or resilience). By shaping RF signals for capacity of the RF system and for the target properties, the RF system may enable a learning of customized RF signals that are suited for certain channel environments, improved interoperability, minimized interference, signal band plans, specific application requirements (e.g., military application requirements), or multi-channel operating environments.

In some implementations, a method for learning of radio signal shaping and properties of RF signals is applied in the modulation and encoding process of a learned RF encoder network. For example, a target shape of an RF signal may be achieved by the encoding process of the learned encoder network rather than by a cascaded process through a separate encoder and a signal shaper such as signal filters. In the same or other implementations, a decoder network is trained or optimized to decode the RF signal shaped by the learned encoder network. In these examples, the learned decoder network may decode various RF signals that have different shapes than an RF signal (i.e., un-shaped modulated RF signal) modulated by idealized or standard modulation schemes. The method for learning of radio signal shaping and properties of RF signals may be applied to various applications such as military/government applications that require secure communications, commercial applications that rely on a limited bandwidth capacity, various wireless commination systems, or various other communications channels such as acoustic, optical, or through other physical mediums.

FIG. 1 illustrates an example of an RF system that updates machine-learning encoder and decoder networks using two loss functions that include a shaping distance metric. The RF system 100 receives input data 108, transmits a representation of the input data 108 through a channel impairment 106, and generates reconstructed data 110 corresponding to the input data 108. The RF system 100 includes an encoder network 102 that processes the input data 108 to generate an RF signal 112 as the representation of the input data 108. The RF system 100 further includes a decoder network 104 that extracts information from a received signal 114 that represents the RF signal 112 having been altered by transmission through the channel impairment 106. The channel impairments here in some instance include conversion of a digital signal to and from an analog signal, amplification and mixing of the signal, the effects of noise, fading, distortion, and otherwise on the signal, as well as potential sources of interference or other impairments. It may also include residual effects of processing such as synchronization and/or subcarrier extraction which occurs on the received signal prior to entering one or more decoder network. The decoder network 104 generates the reconstructed data 110. The channel impairment 106 may be a physical communication channel such as a radio communication channel, an acoustic communication channel, an optical communication channel, or a simulated model channel corresponding to a radio communication channel, an acoustic communication channel, or an optical communication channel.

The encoder network 102 and the decoder network 104 may include a machine-learning network or a neural network including a collection of one or more linear or non-linear algebraic operations. For example, the machine-learning network may include a set of weights and transformations (e.g. layers of dense matrix weight multiplications, additions, and non-linear rectifications) that can be applied to generate the RF signal 112 from the input data 108 or to generate the reconstructed data 110 from the received signal 114. A shape (e.g., a spectral shape) of the RF signal 112 may be determined by the weights or transformations of the machine-learning network included in the encoder network 102 (which in some cases may include channel effects such as fixed hardware effects from a radio transmitted which contribute to an aggregate fixed shape upon reception). A decoding accuracy of the decoder network 104 may be determined by the weights or transformations of the machine-learning network included in the decoder network 104. The decoding accuracy increases as a difference between the input data 108 and the reconstructed data 110 decreases. This decoding accuracy could in some instances reflect the accuracy of decoding correct bits, code words, symbols, frames, etc.

The RF system 100 includes a network update process 116 that updates the encoder network 102 or the decoder network 104. In the network update process 116, for example, the RF system 100 utilizes a first loss function 120 (L1) including a shaping distance metric 118 that represents a difference between an actual shape of the RF signal 112 and a target shape (for example this could be a geometric distance between power spectral densities), and a second loss function 122 (L2) that represents an information loss or alteration between the input data 108 and the reconstructed data 110 (for example this could be cross-entropy loss function). In some implementations, the network update process 116 updates at least one of the encoder network 102 or the decoder network 104 by jointly optimizing the two loss functions L1 and L2. For example, the encoder network 102 and the decoder network 104 may be trained (updated) to minimize or maximize one or both of the two loss functions L1 and L2.

In one example, goals of the network update process 116 include enabling reliable transport of information through a communications channel including the channel impairment 106. For instance, the network update process 116, in optimizing the loss function L2, reduces an error such as a data bit error between the input data 108 (i.e., transmitted information) and the reconstructed data 110 (i.e., recovered information) to a predetermined range. The predetermined range may correspond to a tolerable bit error rate that allows reliable transport of information. Such optimization of the loss function L2 may enable reliable wireless propagation of RF signals, for example, between a phone and a communication tower, between two RF transceivers, or between two acoustic transponders.

In some implementations, the goals of the network update process 116 include shaping the RF signal 112 to achieve a target value(s) of one or more signal properties. For instance, the encoder network 102 and the decoder network 104 may be trained (updated) to minimize the loss function L1. In some cases, the encoder network 102 and the decoder network 104 may be trained (updated) to bring the loss function L1 to a predetermined range. The loss function L1 may include or be derived from a shaping distance metric 118 that represents a difference a spectral shape of the RF signal 112 and a target spectral shape. In some examples, the target spectral shape may be determined based on a learning of channel environments, signal band plans, specific application requirements, or multi-channel operating environments. For instance, the target spectral shape in a military application may correspond to a spectral shape that results in a low detectability, reduced interceptability, increased resilience, or other uniquely favorable properties. In another, the target spectral shape for communications in a noisy environment may correspond to a spectral shape that results in a high detectability. Further examples of determining the shaping distance metric 118 are described below with reference to FIG. 2.

In some implementations, the encoder network 102 and the decoder network 104 may be trained (updated) using an objective function including the loss functions L1 and L2. The objective function can be expressed as f (L1, L2) that may include additional terms and operations other than the two loss functions L1 and L2. The network update process 116 determines one or more weights of at least one of the encoder network 102 or the decoder network 104 based on outputs of the objective function. In some examples, the network update process 116 may utilize a gradient descent technique with back propagation for the joint optimization of the two loss functions L1 and L2. For example, the network update process 116 may use a rate of change of the objective function (e.g., a derivative of the objective function) to bring a value of the objective function to a goal value that can be a minimum value of the objective function or a value within a predetermined range from the minimum value. By jointly optimizing the two loss functions L1 and L2, the RF system 100 may determine an optimum set of weights or connectivity of the encoder network 102 or the decoder network 104, which enables a reliable communication of information within a threshold data error rate, and a signal shape conforming to a target shape specified by a signal shaping loss function L1.

In some implementations, the encoder network 102 may be trained to achieve various types of objective functions including at least one of a measure of reconstruction error, a measure of computational complexity, bandwidth, latency, power, or various combinations thereof, and other objectives. The decoder network 104 may include a machine-learning network that learns how to decode a received signal 114 into reconstructed data 110 that approximates the original input data 108. During training, the encoder network 102 and/or decoder network 104 may be trained by the network update process 116. The encoder network 102 and decoder network 104 may be trained to achieve goal values of the various types of objective functions.

In scenarios of deployment, the encoder network 102 and decoder network 104 may implement encoding and decoding techniques that were previously learned from training, or may be (further) trained during deployment. The encoder network 102 and decoder network 104 may be deployed in various application scenarios to perform communication, using the encoding and decoding representations that were learned during training. In some implementations, the encoder network 102 and/or decoder network 104 may be further updated during deployment based on real-time performance results such as reconstruction error, power consumption, delay, phase change, frequency shift, etc. In these cases, error feedback of loss functions may occur in some instances via a communications bus, or a protocol message within the wireless system which can be used to update the encoder network 102 and/or the decoder network 104, along with information to help characterize the response of the RF channel 106.

The input data 108 and reconstructed data 110 may be any suitable form of information that is to be communicated over a channel, such as a stream of bits, packets, discrete-time signals, or continuous-time waveforms (e.g. voice or telemetry). Implementations disclosed herein are not limited to any particular type of input data 108 and reconstructed data 110, and are generally applicable to learn encoding and decoding techniques for communicating a wide variety of types of information over the RF channel 106 or other forms of communications channels.

In some implementations, the encoder network 102 and decoder network 104 employ one or more signal processing operations, which are suited to the type of RF communication domain. As examples, the encoder network 102 and/or decoder network 104 may implement filtering, modulation, analog-to-digital (A/D) or digital-to-analog (D/A) conversion, equalization, or other signal processing methods that may be suitable for a particular types of RF signals or communication domains. For example, the network 102 or 104 can implement processes for filtering, modulation, equalization, etc. In some examples, the A/D or D/A conversion may be performed by a hardware component configured to convert an output of the encoder network 102 to provide converted output to a channel that corresponds to the communication channel 106, a channel inside of the encoder network 102, or a channel between the communication channel 106 and the decoder network 104. In some implementations, the encoder network 102 and/or decoder network 104 may implement one or more transmit and receive antennas, and other hardware or software suitable for transmitting signals 112 and receiving signals 114 over the RF channel 106.

Therefore, in such scenarios, as shown in the example of FIG. 1, the transmitted signal 112 and received signal 114 may represent actual RF waveforms that are transmitted and received over the RF channel 106 through one or more antennas. Thus, the encoder network 102 and decoder network 104 represent generalized mappings between data 108/110 and RF waveforms 112/114.

By contrast, in some implementations, the RF system 100 may implement signal processing and RF transmission/reception processes separately from the encoder network 102 and decoder network 104. In such implementations, one or more signal transmission and/or signal reception components, such as filtering, modulation, A/D or D/A conversion, single or multiple antennas, etc., may be represented as part of the channel 106. The impairments in the channel 106 may therefore include transmitter/receiver effects, such as filtering impairments, distortion, interference, additive noise, or other impairments in the transmitter and/or receiver components. Therefore, in such scenarios, the transmitted signal 112 and received signal 114 represent intermediate representations of data 108/110, and the channel 106 represents a general transformation of those intermediate representations of information to and from actual RF waveforms that are transmitted and received over an RF medium. For example, the transmitted signal 112 and received signal 114 may represent basis coefficients for RF waveforms (e.g., OFDM or wavelet basis function values), time-domain samples of RF waveforms, distributions over RF waveform values, or other intermediate representations that may be transformed to and from RF waveforms.

In scenarios of training, the reconstructed data 110 may be compared with the original input data 108, and the encoder network 102 and/or the decoder network 104 may be trained (updated) based on results of the reconstruction. In some implementations, updating the encoder network 102 and/or decoder network 104 may also be based on other factors, such as computational complexity of the machine-learning networks (which can be measured, for example, by the number of parameters, number of multiplies/adds, execution time, Kolmogorov complexity, or otherwise), transmission bandwidth or power used to communicate over the channel 106, or various combinations thereof and other metrics.

In some implementations, the encoder network 102 and the decoder network 104 may include artificial neural networks that include one or more connected layers of parametric multiplications, additions, and non-linearities. In such scenarios, updating the encoder network 102 and/or decoder network 104 may include updating weights of the neural network layers, or updating connectivity in the neural network layers, or other modifications of the neural network architecture, so as to modify a mapping of inputs to outputs.

The encoder network 102 and the decoder network 104 may be configured to encode and decode using any suitable machine-learning technique. In general, the encoder network 102 may be configured to learn a mapping from input data 108 into a lower-dimensional or higher-dimensional representation as the transmitted signal 112. Analogously, the decoder network 104 may be configured to learn a reverse mapping from a lower-dimensional or higher-dimensional received signal 114 into the reconstructed data 110.

As an example, the mappings that are implemented in the encoder network 102 and decoder network 104 may involve learning a set of basis functions for RF signals. In such scenarios, for a particular set of basis functions, the encoder network 102 may transform the input data 108 into a set of basis coefficients corresponding to those basis functions, and the basis coefficients may then be used to generate a transmitted RF waveform (for example, by taking a weighted combination of the basis functions weighted by the basis coefficients). Analogously, the decoder network 104 may generate the reconstructed data 110 by generating a set of basis coefficients from a received RF waveform (for example by taking projections of the received RF waveform onto the set of basis functions). The basis functions themselves may be any suitable orthogonal or non-orthogonal set of basis functions, subject to appropriate constraints on energy, amplitude, bandwidth, or other conditions (e.g., OFDM carriers).

During deployment, in some implementations, the encoder network 102 and/or decoder network 104 may utilize simplified encoding and decoding techniques based on results of training machine-learning networks. For example, the encoder network 102 and/or decoder network 104 may utilize approximations or compact look up tables based on the learned encoding/decoding mappings. In such deployment scenarios, the encoder network 102 and/or decoder network 104 may implement more simplified structures, rather than a full machine-learning network. Techniques such as distillation may be used to train smaller networks or other approximations which perform the same signal processing function.

In some implementations, the encoder network 102 and/or decoder network 104 may include one or more fixed components or algorithms that are designed to facilitate communication over RF channels, such as expert synchronizers, estimators, equalizers, etc. As such, during training, the encoder network 102 and/or decoder network 104 may be trained to learn encoding/decoding techniques that are suitable for such fixed components or algorithms.

RF signals that are transmitted and received by the RF system 100 may include any suitable radio-frequency signal, such as acoustic signals, optical signals, or other analog waveforms. The spectrum of RF signals that are processed by the RF system 100 may be in a range of 1 kHz to 300 GHz. For example, such RF signals include very low frequency (VLF) RF signals between 1 kHz to 30 kHz, low frequency (LF) RF signals between 30 kHz to 300 kHz, medium frequency (MF) RF signals between 300 kHz to 1 MHz, high frequency (HF) RF signals between 1 MHz to 30 MHz, and higher-frequency RF signals up to 300 GHz.

Figure 2:
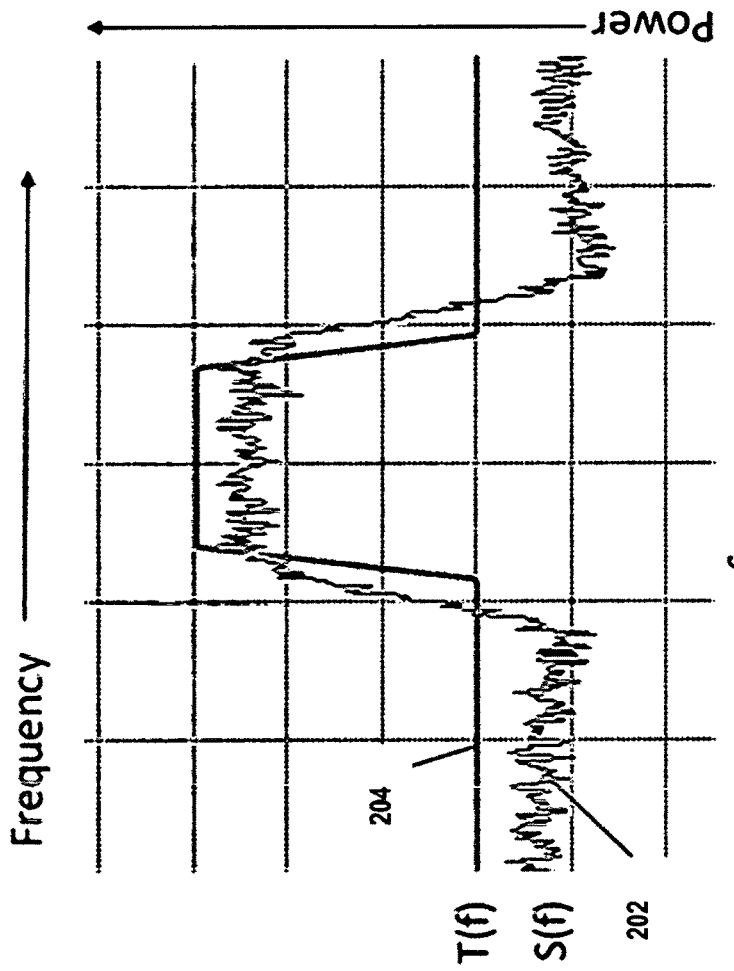
FIG. 2 illustrates an example of a shaping distance metric in a frequency and power domain and example cost functions to determine the shaping distance metric.

FIG. 2 illustrates an example of a shaping distance metric in a frequency and power domain and example cost functions to determine the shaping distance metric. For example, an actual signal shape 202 (e.g., a signal shape corresponding to an RF signal 112 in FIG. 1) is expressed as a function of frequency, S(f), and a target signal shape 204 is expressed as a function of frequency, T(f). The actual signal shape 202, S(f), may be generated by computation on one or more outputs from the encoder network 102 corresponding to a single or aggregate of many input data 108 (e.g., a data bit, a stream of data bits, a symbol, a packet, etc.). The target signal shape 204, T(f), may be a spectral mask that represents a spectral shape or an envelope of signal to comply with restrictions or standards on radio emitter power envelopes, an optimal signal shape for mitigating interference with other radio emitters or environments, or interoperation with radio transceivers that are expected to output a specific signal shape for various reasons including performance optimization of the radio transceivers.

A shaping distance metric 118 (see FIG. 1) may be determined based on a difference between the actual signal shape 202 and the target signal shape 204. In some examples, the shaping distance metric 118 may include a cost function $C_1$ that summates or integrates squared errors between S(f) and T(f) over a span of frequency. In other examples, the shaping distance metric 118 may include a cost function $C_2$ that summates or integrates over a span of frequency (i) squared errors between S(f) and T(t) in case S(f) is greater than a threshold (zero in this example) and (ii) squared errors between the threshold and the T(f) in case S(f) is less than or equal to the threshold. Many other shaping distance metrics are possible. In the example shown in FIG. 2, the actual signal shape 202 and the target signal shape 204 represent power spectral density as a function of center frequency. In other examples, the signal shapes 202 and 204 represent other dimensions such as amplitudes, phases, or other properties of an RF signal with respect to frequency, time, or distance, etc.

Figure 3:
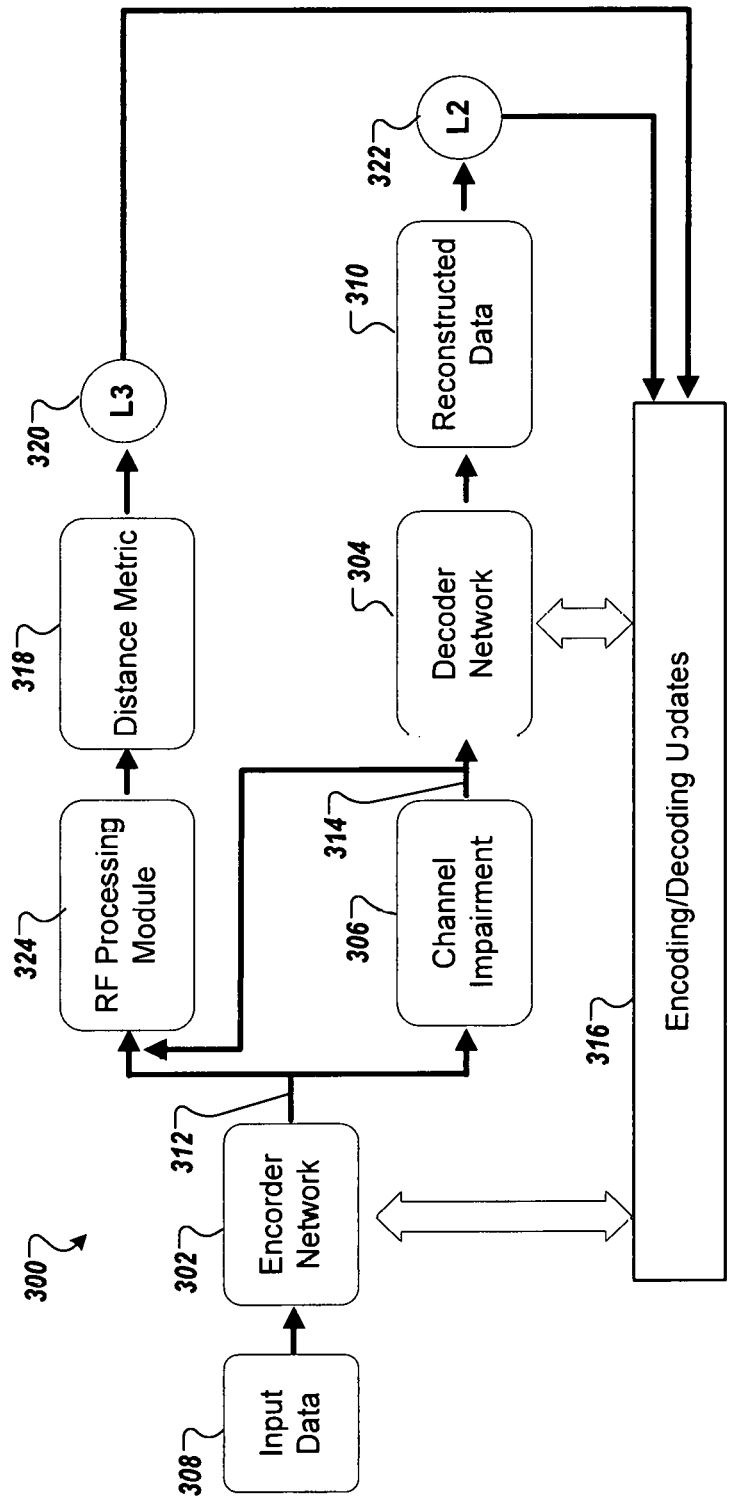
FIG. 3 illustrates an example of an RF system that updates machine-learning encoder and decoder networks using a loss function produced by a known RF processing module and another loss function representing information loss in reconstructed data.

FIG. 3 illustrates an example of an RF system that updates machine-learning encoder and decoder networks using a loss function produced by a known RF processing module and another loss function representing information loss in reconstructed data. One or more components of the RF system 300 may correspond to one or more components of the RF system 100 of FIG. 1. For instance, the RF system 300 receives input data 308, transmits a representation of the input data 308 through a channel impairment 306, and generates reconstructed data 310 corresponding to the input data 308. The RF system 300 includes an encoder network 302 that processes the input data 308 to generate an RF signal 312 as the representation of the input data 308. The RF system 300 further includes a decoder network 304 that extracts information from a received RF signal 314 that represents the RF signal 312 having been altered by transmission through the channel impairment 306. The decoder network 304 generates the reconstructed data 310. Similar to the channel impairment 106 in FIG. 1, the channel impairment 306 may be a real-world communication channel or a simulated communication channel representing the real-world communication channel.

The encoder network 302 and the decoder network 304 may include a machine-learning network or a neural network including a collection of one or more linear algebraic operations. For example, the machine-learning network may include a set of weights and transformations that can be applied to generate the RF signal 312 from the input data 308 or to generate the reconstructed data 310 from the received signal 314. One or more signal properties of the RF signal 312 may be determined by the weights or transformations of the machine-learning network included in the encoder network 302. A decoding accuracy of the decoder network 304 may be determined by the weights or transformations of the machine-learning network included in the decoder network 304. For example, the signal properties of the RF signal 312 include a shape of the RF signal 312, a probability of detection of at least one of signal shape, signal power, a correlation strength, signal classification accuracy, a moment, a frequency, a signature, or a cyclostationary property of the RF signal 312, a false alarm rate, a frequency shift, or a SNR of the RF signal 312.

The RF system 300 includes a known RF processing module 324 that processes at least one of the RF signal 312 or the received RF signal 314. In some implementations, the RF processing module 324 utilizes one or more of the RF signal 312 and the received RF signal 314 to determine the actual values of one or more properties of the RF signal 312. The RF processing module 324 may determine one or more signal properties of the RF signal 312 and calculate a distance metric 318 that represents a difference between an actual value of a signal property among the signal properties and a target value of the signal property. For example, the RF processing module 324 may include a matched filter, an ambiguity function, a correlation function, or other energy detection algorithms that are available to the RF system 300 to determine actual values of one or more properties of the RF signal 312.

The RF system 300 may include a network update process 316 that updates the encoder network 302 or the decoder network 304. For example, in the network update process 316, the RF system 300 may utilize a loss function 320 (L3) corresponding to the distance metric 318 that represents a difference between an actual value of the RF signal 312 and a target value of the signal property, and a second loss function 322 (L2) that represents an information loss or alteration from the input data 308 to the reconstructed data 310. The network update process 316 and the second loss function 322, in terms of updating the encoder network 302 or the decoder network 304 based on the second loss function 322, may correspond to the network update process 116 and second loss function 122, respectively, described above with reference to FIG. 1.

The network update process 316 updates at least one of the encoder network 302 or the decoder network 304 by jointly optimizing the two loss functions L3 and L2. For example, the encoder network 302 and the decoder network 304 may be trained (updated) to minimize one or both of the two loss functions L3 and L2. In some examples, the encoder network 302 and the decoder network 304 may be trained (updated) to minimize the loss function L2 and maximize the loss function L3. For instance, in a signal security application, the encoder network 302 may be optimized to minimize a probability of detection, which corresponds to maximizing the loss function L3, while minimizing information loss, which corresponds to minimizing the loss function L2.

In some implementations, the encoder network 302 and the decoder network 304 may be trained (updated) using an objective function including the loss functions L3 and L2. The objective function can be expressed as f (L3, L2) that may include additional terms and operations other than the two loss functions L3 and L2. The network update process 316 determines one or more weights of at least one of the encoder network 302 or the decoder network 304 based on outputs of the objective function. In some examples, the network update process 316 may utilize a gradient descent technique with back propagation for the joint optimization of the two loss functions L3 and L2. For example, the network update process 316 may use a rate of change of the objective function (e.g., a derivative of the objective function) to bring a value of the objective function to a goal value that can be a minimum value of the objective function or a value within a predetermined range from the minimum value. By jointly optimizing the two loss functions L3 and L2, the RF system 300 may determine an optimum set of weights or connectivity of the encoder network 302 or the decoder network 304, which enables a reliable communication of information within a threshold data error rate, and a signal property conforming to a target value or target shape. In other examples, the network update process may adopt an iterative adversarial update process wherein optimization cycles between different loss functions iteratively or combines them probabilistically (e.g. a Wasserstein distance or similar).

Figure 4:
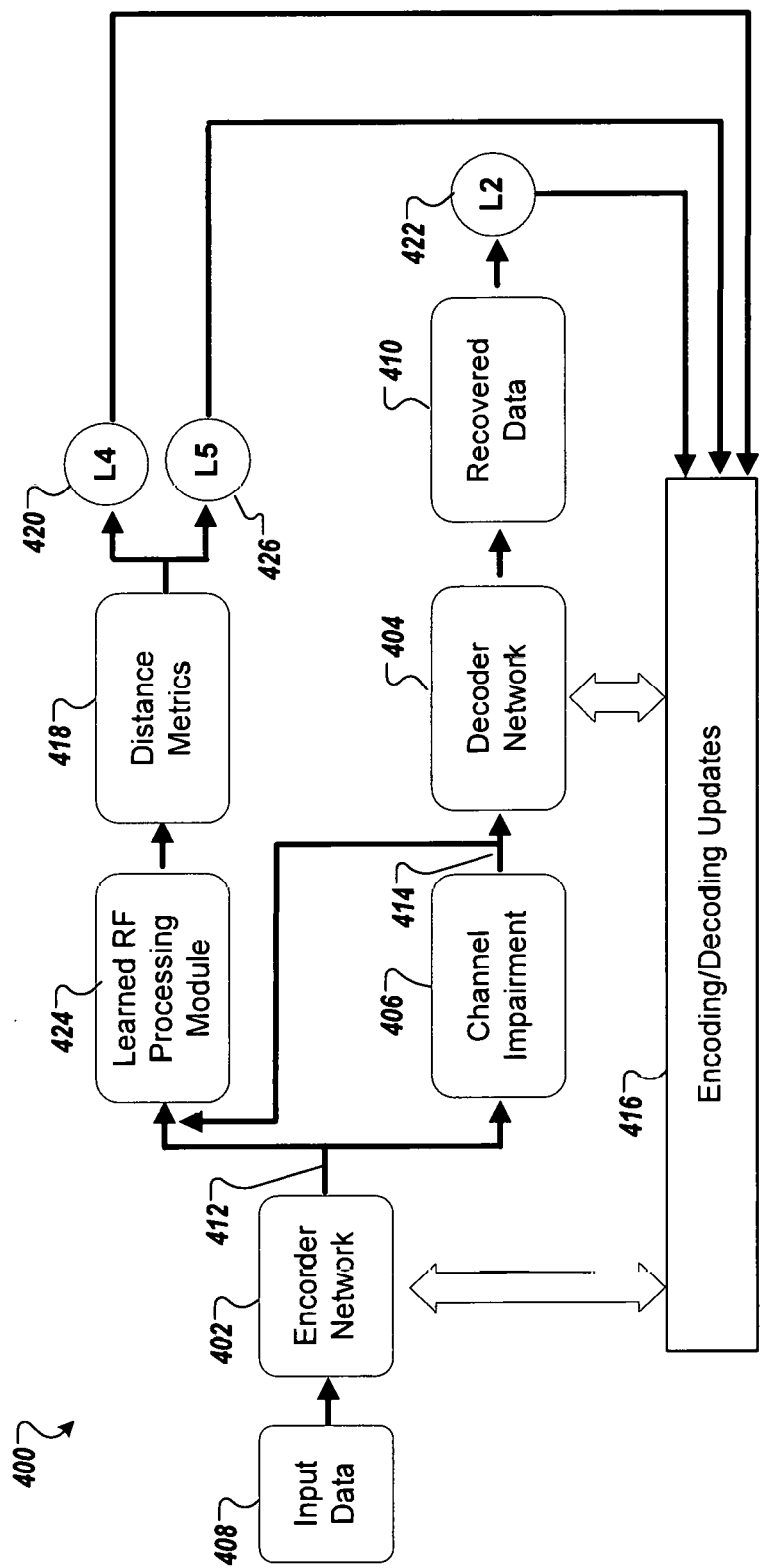
FIG. 4 illustrates an example of an RF system that updates machine-learning encoder and decoder networks using loss functions produced by a learned machine-learning RF processing module and another loss function representing information loss in reconstructed data.

FIG. 4 illustrates an example of an RF system that updates machine-learning encoder and decoder networks using loss functions produced by a learned machine-learning RF processing module and another loss function representing information loss in reconstructed data. One or more components of the RF system 400 may correspond to one or more components of the RF system 100 of FIG. 1 or the RF system 300 of FIG. 3. For instance, the RF system 400 receives input data 408, transmits a representation of the input data 408 through a channel impairment 406, and generates reconstructed data 410 corresponding to the input data 408. The RF system 400 includes an encoder network 402 that processes the input data 408 to generate an RF signal 412 as the representation of the input data 408. The RF system 400 further includes a decoder network 404 that extracts information from a received RF signal 414 which represents the RF signal 412 having been altered by transmission through the channel impairment 406. The decoder network 404 generates the reconstructed data 410. Similar to the channel impairment 106 in FIG. 1 and the channel impairment 306 of FIG. 3, the channel impairment 406 may be a real-world communication channel or a simulated communication channel representing the real-world communication channel.

The encoder network 402 and the decoder network 404 may include a machine-learning network or a neural network including a collection of one or more linear algebraic operations. For example, the machine-learning network may include a set of weights and transformations that can be applied to generate the RF signal 412 from the input data 408 or to generate the reconstructed data 410 from the received signal 314. One or more signal properties of the RF signal 412 may be determined by the weights or transformations of the machine-learning network included in the encoder network 402. A decoding accuracy of the decoder network 404 may be determined by the weights or transformations of the machine-learning network included in the decoder network 404.

For example, the signal properties of the RF signal 412 include a shape of the RF signal 412, a probability of detection of at least one of power, a moment, a frequency, or a cyclostationary property of the RF signal 412, a false alarm rate, a frequency shift, or a SNR of the RF signal 412. In some implementations, the signal properties of the RF signal 412 correspond to learned properties related to a side effect or a metric of encoding of the RF signal 412. In some examples, two or more learned properties may be used to optimize the encoder network 402 or the decoder network 403 by minimizing or maximizing the side effect or the metric of encoding of the RF signal 412.

The RF system 400 includes a learned RF processing module 424 that processes at least one of the RF signal 412 or the received RF signal 414. In some implementations, the learned RF processing module 424 utilizes one or more of the RF signal 412 and the received RF signal 414 to determine actual values of one or more properties of the RF signal 412. The learned RF processing module 424 may determine one or more signal properties of the RF signal 412 described above to generate distance metrics 418, each of which represents a difference between an actual value of a signal property among the signal properties and a target value of the signal property, One example of such a learned RF processing module might be a convolutional neural network (CNN) or residual neural network (ResNet) trained to perform binary classification for signal detection, or multi-label classification for signal classification tasks, taking in raw samples, signal representations, and/or features and producing best learned estimates for such signal properties. By training against such a learned processing module adversarially, a communications system can be designed to reduce or improve the efficacy of such learned processing modules against the signal.

In one example, the learned RF processing module 424 may determine a signal property related to a probability of detection and generate a first distance metric related to an increase of the probability of detection and a second distance metric related to a decrease of the probability of detection. In this case, the second distance metric may be in an adversarial relation with the first distance metric. In other examples, the learned RF processing module 424 determines two or more independent signal properties and generate a first distance metric related to a first signal property of the independent signal properties and a second distance metric related to a second signal property of the independent signal properties. In some implementations, the distance metrics 418 include a first representation of a difference between an actual value of the RF signal 412 and a target value of a first signal property and a second representation of a difference between an actual value of the RF signal 412 and a target value of a second signal property.

The RF system 400 includes a network update process 416 that updates the encoder network 402 or the decoder network 404. For example, in the network update process 416, the RF system 400 may utilize (i) a loss function 420 (L4) determined from the first representation, (ii) a loss function 426 (L5) determined from the second representation, and (iii) a loss function 322 (L2) that represents an information loss or alteration from the input data 408 to the reconstructed data 410. As discussed above, in some cases, the first signal property and the second signal property may be dependent on each other, or may correspond to one common signal property. For example, the loss function L5 may correspond to an adversarial loss function of the loss function L4 in which the loss function L4 seeks to maximize a property of the RF signal 412 while the loss function L5 seeks to minimize the property. In some implementations, the first signal property and the second signal property are independent from each other.

In some implementations, the network update process 416 may determine weights of the encoder network 402 or the decoder network 404 that minimize or maximize one or both of the two loss functions L4 and L5 while minimizing the loss function L2. For example, when the loss functions L4 and L5 relate to a SNR and a probability of detection, respectively, the network update process 416 may determine one or more weights of the encoder network 402 that minimize both loss functions L4 and L5. The network update process 416 and the second loss function 422, in terms of updating the encoder network 402 or the decoder network 404 based on the loss function 422, may correspond to the network update process 116 and second loss function 122, respectively, described above with reference to FIG. 1.

In some implementations, the network update process 416 updates at least one of the encoder network 402 or the decoder network 404 by jointly optimizing the three loss functions L4, L5, and L2. For example, the encoder network 402 and the decoder network 404 may be trained (updated) to minimize one or both of the two loss functions L4 and L5 while minimizing the loss function L2. In some examples, the encoder network 402 and the decoder network 404 may be trained (updated) to minimize the loss function L2, maximize one of the loss functions L4 or L5, and minimize the other of the loss functions L4 or L5. In this case, the loss function L5 may correspond to an adversarial loss function of the loss function L4 as discussed above.

In some implementations, the encoder network 402 and the decoder network 404 may be trained (updated) using an objective function including the loss functions L4, L5, and L2. The objective function can be expressed as f (L4, L5, L2) that may include additional terms and operations other than the loss functions L4, L5, and L2. The network update process 416 determines one or more weights of at least one of the encoder network 402 or the decoder network 404 based on outputs of the objective function. In some examples, the network update process 416 may utilize a gradient descent technique with back propagation for the joint optimization of the three loss functions L4, L4, and L2. For example, the network update process 416 may use a rate of change of the objective function (e.g., a derivative of the objective function) to bring a value of the objective function to a goal value that can be a minimum value of the objective function or a value within a predetermined range from the minimum value. By jointly or iteratively optimizing the loss functions L4, L5, and L2, the RF system 400 may determine an optimum set of weights or connectivity of the encoder network 402 or the decoder network 404, which enables a reliable communication of information within a threshold data error rate, and one or more signal properties conforming to their target values or target shapes.

Figure 5:
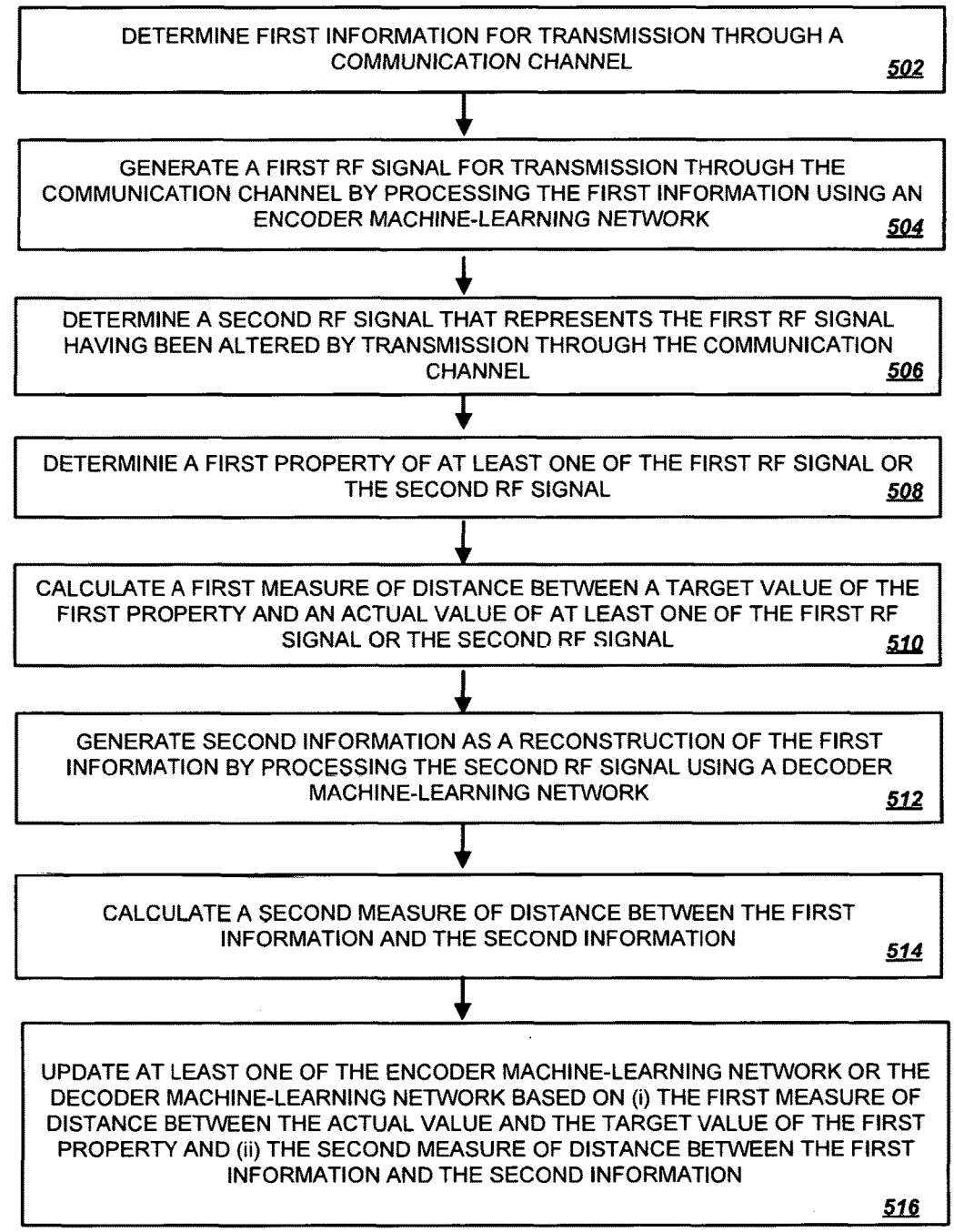
FIG. 5 is a flowchart illustrating an example method of updating machine-learning encoder and decoder networks using multiple distance metrics.

FIG. 5 is a flowchart illustrating an example method 500 of updating machine-learning encoder and decoder networks using multiple distance metrics. The method 500 may be performed by one or more processors, such as one or more Central Processing Units (CPUs), Graphics Processing Units (GPUs), Digital Signal Processors (DSPs), Field Programmable Gate Arrays (FPGAs), Application Specific Integrated Circuits (ASICs), Tensor Processing Units (TPUs), or neuromorphic chips, or vector accelerators that execute instructions encoded on a computer storage medium.

In some implementations, the method 500 is used to determine a signal shape of an RF signal using a system 100 that includes a learned machine learning network such as the encoder network 102, the decoder network 104, or both, as described with respect to FIG. 1. In some implementations, the method 500 is used to update a system 300 that includes one or more learned machine learning networks such as the encoder network 302, the decoder network 306, or both, as described with respect to FIG. 3. In other implementations, the method 500 is used to update a system 400 that includes one or more learned machine learning networks such as the encoder network 402, the decoder network 406, or both, as described with respect to FIG. 4. For example, the operations described in method 500 are performed by one or more processors such as a processor 902 or a processor 952 as described with respect to FIG. 8 (below).

The method 500 may be performed by one or more processor configured to train one or more machine-learning networks to process information transmitted through a communication channel. In some examples, the method 500 includes at least one of: training, using a transmitter device in a communications system that includes the communication channel, the encoder machine-learning network, and the decoder machine-learning network; or training, using a receiver device in the communications system, the encoder machine-learning network, and the decoder machine-learning network. In some examples, the transmitter device and the receiver device may be integrated into a single device such as a radio transceiver.

The method 500 includes determining first information for transmission through a communication channel (502). The first information may be any suitable discrete-time, analog, discrete-valued, or continuous-valued information or input data. In some instances, this input information may be whitened discrete bits, packets, or symbols, or in other cases, it may follow the distribution of a non-whitened information source.

The method 500 further includes generating a first RF signal for transmission through the communication channel by processing the first information using an encoder machine-learning network (504). For example, the first RF signal may represent an analog RF waveform that is transmitted over a channel, or may be an intermediate representation (e.g., samples, basis coefficients, distributions over RF waveforms, etc.) that undergoes further processing (e.g., filtering, D/A conversion, modulation, etc.) to generate an analog RF waveform. This encoding process may utilize any suitable mapping from an input information space into an RF signal space, as discussed in regard to FIG. 1.

The method 500 further includes determining a second RF signal that represents the first RF signal having been altered by transmission through the communication channel (506). For example, in training scenarios, the effects of the communication channel may be implemented by a model of a channel obtained by simulation and/or real channel data, or may be implemented by a real-world communication channel. As discussed above, the second RF signal may represent an analog RF waveform that is received over a channel, or may be an intermediate representation (e.g., samples, basis coefficients, distributions over RF waveforms etc.) that is a result of processing (e.g., filtering, sampling, equalizing, etc.) a received analog RF waveform.

The method 500 further includes determining a first property of at least one of the first RF signal or the second RF signal (508). For example, the first property of the first RF signal or the second RF signal may be a signal shape of the first or second RF signal such as an envelope of power density over a span of frequency as discussed above with reference to FIGS. 1 and 2. In some examples, the first property of the first or second RF signal represents a probability of energy detection, signal characterization or identification, localization, power, bandwidth, complexity of modulation, vulnerability to radio jamming, vulnerability to attack, a SNR, a frequency shift, a moment, a cyclostationary property, or a level of fading or interference. In some examples, a network update process of an RF system (e.g., RF system 100 in FIG. 1) determines the first property of at least one of the first RF signal or the second RF signal. In other examples, a separate autoencoder included in the RF system may determine the first property of at least one of the first RF signal or the second RF signal.

The method 500 further includes calculating a first measure of distance between a target value of the first property and an actual value of at least one of the first RF signal or the second signal (510). This first measure of distance may be implemented as a loss function (e.g., the loss function 120 in FIG. 1, the loss function 320 in FIG. 3) or a plurality loss functions (e.g., the loss functions 420 and 426 in FIG. 4), and may represent a difference or error between an actual value of the first RF signal corresponding to the determined first property and a target value of the determined first property.

In one example, the first property includes a target spectral shape of the first RF signal, and the first measure of distance is a shaping distance metric that represents a difference between a spectral shape of the first RF signal and the target spectral shape of the first RF signal. For example, the shaping distance metric may be determined by calculating (i) a summation of squared differences between the spectral shape of the first RF signal and the target spectral shape of the first RF signal, or (ii) a summation of squared differences between the target spectral shape of the first RF signal and a maximum among the spectral shape of the first RF signal and a preset threshold value, as discussed above regarding FIG. 2.

In some implementations, the first measure of distance includes a probability of detection of at least one of power of the first RF signal or the second RF signal, a probability of correct classification of the first RF signal or the second RF signal, a strength of a moment, correlation, cumulant, or signature of the first or second RF signal, a frequency of the first RF signal or the second RF signal, or a cyclostationary property of the first RF signal or the second RF signal.

The method 500 further includes generating second information as a reconstruction of the first information by processing the second RF signal using a decoder machine-learning network (512). This decoding process may utilize any suitable mapping from an RF signal space into reconstructed information space, as discussed above in regards to FIG. 1.

A second measure of distance is calculated between the second information and the first information (514). The second measure of distance may be implemented as a loss function (e.g., the loss function 122 in FIG. 1, the loss function 322 in FIG. 3, or the loss function 422 in FIG. 4) and may represent a difference or error between the original input information and the second (reconstructed) information. For example, the second measure of distance may include cross-entropy, a mean squared error, a mean average error, or other distance metrics (e.g., f-divergence, Kullback-Leibler divergence, total variation distance, etc.), or may combine several geometric and/or entropy-based distance metrics into an aggregate expression for distance.

The method 500 further includes updating at least one of the encoder machine-learning network or the decoder machine-learning network based on (i) the first measure of distance between the actual value and the target value of the first property and (ii) the second measure of distance between the first information and the second information (516). This updating process 516 may be applied to the encoder network and/or the decoder network in a joint or iterative manner, or individually. The updates may generally include updating any suitable machine-learning network feature of the encoder network and/or decoder network, such as network weights, architecture choice, machine-learning model, or other parameter or connectivity design. As an example, in some implementations, if the encoder network and/or decoder network are trained to learn a set of basis functions for communicating over a RF channel, then the update process 516 may include updating the set of basis functions that are utilized in the encoder network and/or decoder network.

Figure 6:
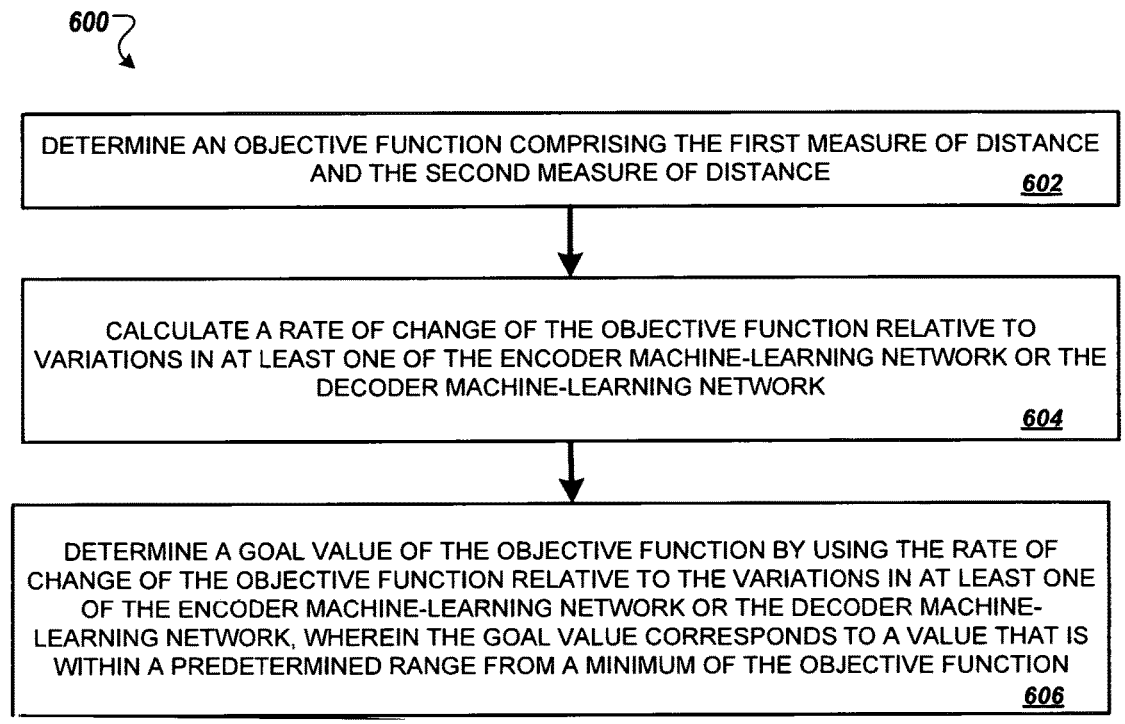
FIG. 6 is a flowchart illustrating an example method of updating machine-learning encoder and decoder networks using an object function including multiple distance metrics.

FIG. 6 is a flowchart illustrating an example method 600 of updating machine-learning encoder and decoder networks using an object function including multiple distance metrics. In some implementations, the method 600 may be performed to update one or more of the encoder network 102, 302, or 402, or the decoder network 104, 304, or 404, as described with respect to FIGS. 1, 3, and 4. In some examples, the method 600 is performed to implement the process corresponding to 516 described with respect to FIG. 5. For example, the method 600 includes determining an objective function comprising the first measure of distance and the second measure of distance (602). For example, as discussed above in FIGS. 1 and 3, the objective function may include a loss function L1/L3 determined from the first measure of distance and a loss function L2 determined from the second measure of distance. In some cases, each of the loss functions L1 and L3 may correspond to the first measure of distance. In other cases, the loss functions L1 and L3 may be derived from the first measure of distance. The loss function L2 may correspond to the second measure of distance, or may be derived from the second measure of distance. In some examples, the objective function includes additional terms and operations other than the loss functions L1, L3, and L2.

The method 600 further includes calculating a rate of change of the objective function relative to variations in at least one of the encoder machine-learning network or the decoder machine-learning network (604). For example, the rate of change of the objective function may be calculated by a derivative (e.g., $\delta F/\delta w$) of the objective function with respect to a weight or a parameter of the encoder network or the decoder network, where $\delta F$ indicates a change of the objective function as a consequence of a change of the weight ($\delta w$). In some implementations, the rate of change of the objective may be determined in a discrete method with discrete changes of the weight.

The method 600 further includes determining a goal value of the objective function by using the rate of change of the objective function relative to the variations in at least one of the encoder machine-learning network or the decoder machine-learning network (606). The goal value may correspond to a value that is within a predetermined range from a minimum of the objective function. For example, the goal value of the objective function may be achieved when an absolute value of the rate of change approaches to a certain value (e.g., zero). In some examples, the method 600 may determine to stop updating the encoder network or the decoder network once the objective function reaches a value within the predetermined range from the minimum of the objective function for an efficient optimization, which may result in a reduction of an optimization time while transporting information within in a threshold error rate.

The method 600 may determine at least one of a first weight of the encoder network or a second weight of the decoder network so that the objective function can achieve the goal value. For example, the method 600 may determine at least one of the first weight of the encoder network or the second weight of the decoder network to achieve (i) at least one of a maximum value or a minimum value of the first measure of distance and (ii) a minimum value of the second measure of distance. The updating may result in a value of the first measure of distance below or above a first predetermined threshold, and a value of the second measure of distance below a second predetermined threshold. Alternatively or in addition, the method 600 may determine one or more weights of the encoder network or the decoder network to minimize the loss function L2 in FIGS. 1, 3, and 4, and to maximize or minimize one or more of the loss functions L1, L3, L4, or L5.

Figure 7:
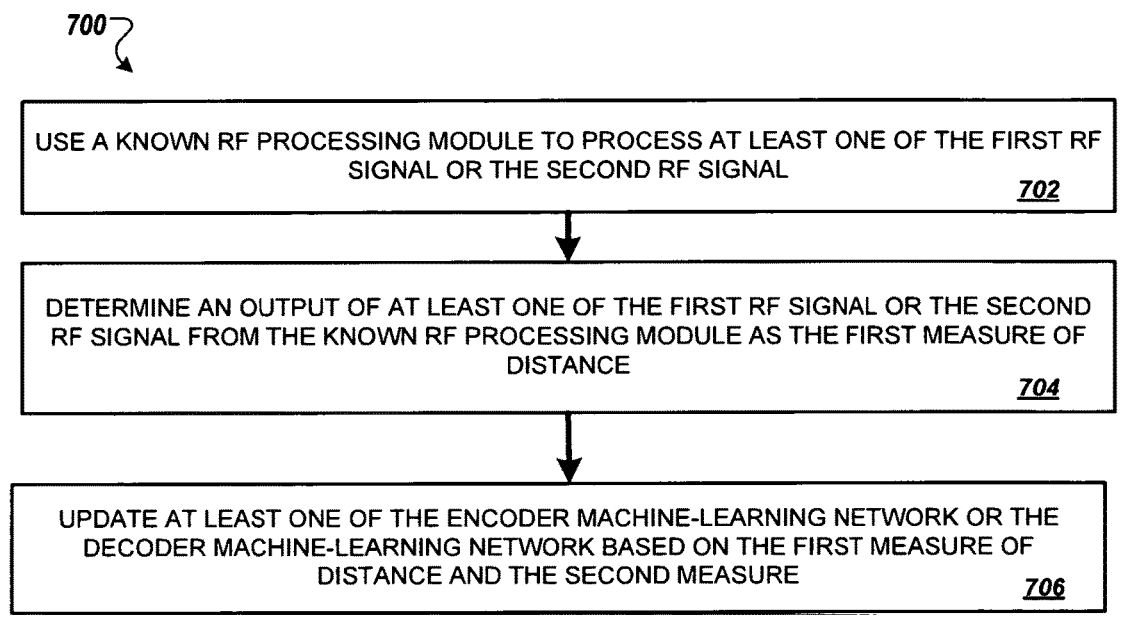
FIG. 7 is a flowchart illustrating an example method of determining a distance metric between an actual value and a target value of an RF signal using an output of a known RF processing module.

FIG. 7 is a flowchart illustrating an example method 700 of determining a distance metric between an actual value and a target value of an RF signal using an output of a known RF processing module. In some implementations, the method 700 may be performed to update one or more of the encoder network 302 or the decoder network 304, as described with respect to FIG. 3. In some examples, the method 700 is performed to implement the process corresponding to 508 described with respect to FIG. 5 to determine a first property of at least one of the first RF signal or the second RF signal by processing at least one of the first RF signal or the second RF signal through the known RF processing module 324. In some examples, the method 700 is performed to implement the process corresponding to 510 described with respect to FIG. 5 to calculate a first measure 318 of distance between an actual value and a target value of an RF signal using an output 320 of the known RF processing module 324. The method 700 includes using a known RF processing module to process at least one of the first RF signal or the second RF signal (702). For example, as discussed above with reference to FIG. 3, the known RF processing module may receive an input that includes one or both of an RF signal (the first RF signal) generated from an encoder network and a received RF signal (the second RF signal) received through a communication channel to determine a distance metric.

The method 700 further includes determining the first measure of distance based on an output of at least one of the first RF signal or the second RF signal from the known RF processing module (704). For example, the known RF processing module may output an actual value or a representation of the actual value of a signal property of the first RF signal. The known RF processing module may determine the first measure of distance that represents a difference between the actual value of the signal property and a target value of the signal property. As discussed above with regard to FIG. 3, the RF processing module may include a matched filter, an ambiguity function, a correlation function, or other energy detection algorithms, and determine actual values of one or more properties of the RF signal. In some implementations, the known RF processing module directly outputs the first measure of distance without separately outputting an actual value or a representation of the actual value of the signal property.

The method 700 further includes updating at least one of the encoder machine-learning network or the decoder machine-learning network based on the first measure of distance and the second measure (706). This updating process 706 may correspond to the updating process 516 or the method 600 described above. For example, at least one of the encoder machine-learning network or the decoder machine-learning network is updated using the first measure of distance determined from the output of the known RF processing module and the second measure of distance that represents a difference between the first information and the second information.

Figure 8:
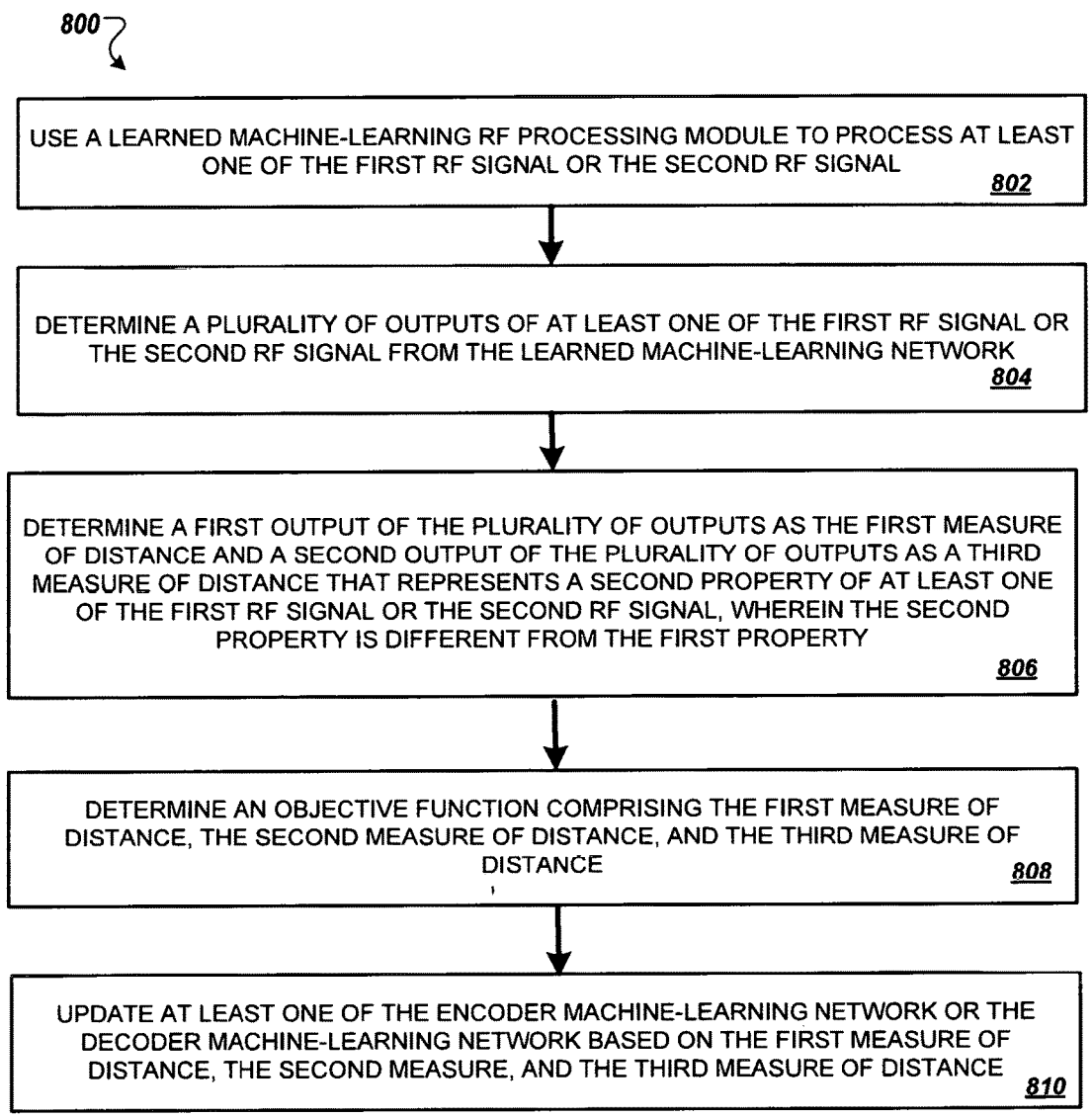
FIG. 8 is a flowchart illustrating an example method of determining a plurality of distance metrics using a learned machine-learning processing module to update encoder and decoder networks based on the plurality of distance metrics.

FIG. 8 is a flowchart illustrating an example method 800 of determining a plurality of distance metrics using a learned machine-learning processing module to update encoder and decoder networks based on the plurality of distance metrics. In some implementations, the known RF processing module 324 in FIG. 3 corresponds to or is replaced with a learned RF processing module 424 in FIG. 4. In some implementations, the method 800 may be performed to update one or more of the encoder network 402 or the decoder network 404, as described with respect to FIG. 4. In some examples, the method 800 is performed to implement the process corresponding to 508 described with respect to FIG. 5 to determine a plurality of properties of at least one of the first RF signal or the second RF signal by processing at least one of the first RF signal or the second RF signal through the learned RF processing module 424, as described with respect to FIG. 4. In some examples, the method 800 is performed to implement the process corresponding to 510 described with respect to FIG. 5 to calculate measures 418 of distance between an actual value and a target value of an RF signal using outputs 420, 426 of the learned RF processing module 424. In some examples, the method 800 is performed to implement the process corresponding to 516 described with respect to FIG. 5 to update at least one of the encoder network 402 or the decoder network 404 based on the three loss functions L2, L4, and L5, as described with respect to FIG. 4.

In some examples, the learned RF processing module continues to learn or update its weights, parameters, or connectivity that are independent from the weights, parameters, or connectivity of the encoder network or the decoder network. In some examples, the learned RF processing module and the encoder/decoder networks are jointly trained using the method 800.

The method 800 includes using a learned machine-learning RF processing module to process at least one of the first RF signal or the second RF signal (802). As discussed above with reference to FIG. 4, the learned RF processing module may receive an input that includes one or both of an RF signal (the first RF signal) generated from an encoder network and a received RF signal (the second RF signal) through a communication channel to determine a plurality of distance metrics (e.g., two, three, or other numbers of metrics). In some examples, the learned RF processing module may include a machine-learning network or a neural network including a collection of one or more linear algebraic operations to process at least one of the first RF signal or the second RF signal.

The method 800 further includes determining a plurality of outputs of at least one of the first RF signal or the second RF signal from the learned machine-learning network (804). For example, the machine-learning network of the learned RF processing module may include a set of weights and transformations that can be applied to the first RF signal, the second RF signal, a representation of the first RF signal, or a representation of the second RF signal to generate the plurality of distance metrics from the first RF signal or the second RF signal. In some cases, these plurality of distance metrics may correspond to the plurality of outputs from the learned RF processing module. In some cases, the plurality of distance metrics may be determined by additional operations with the plurality of outputs from the learned RF processing module.

The method 800 further includes determining a first output of the plurality of outputs as the first measure of distance and a second output of the plurality of outputs as a third measure of distance that represents a second property of the first RF signal or the second RF signal, where the second property is different from the first property (806). As discussed above, the learned RF processing module outputs a plurality of distance metrics. In some implementations, one of the plurality of distance metrics corresponds to the first measure of distance that represents a difference between an actual value of the first RF signal and a target value of the first property of at least one of the first RF signal or the second RF signal. In some implementations, the plurality of distance metrics correspond to a plurality of loss functions as discussed with regard to FIG. 4. The first output may relate to a first signal property, and the second output may relate to a second signal property that is different from the first signal property. In some cases, the first output may be correlated or inversely correlated to the second output. For instance, a set of weights of the encoder network that maximizes the first measure of distance determined from the first output may minimize the third measure of distance determined from the second output. In another example, a set of weights of the encoder network that minimizes the first measure of distance determined from the first output may also minimize the third measure of distance determined from the second output.

The method 800 further includes determining an objective function comprising the first measure of distance, the second measure of distance, and the third measure of distance (808). In some implementations, a joint optimization of multiple measures of distance may be realized using an objective function that includes the multiple measures of distance. For example, the objective function described above with regard to FIG. 4 includes the first measure of distance (e.g., the loss function L4), the second measure of distance (e.g., the loss function L2), and the third measure of distance (e.g., the loss function L5). In some cases, each measure of distance may be optimized individually or iteratively, which may result in a longer optimization time than the joint optimization or an optimization result that is more or less favorable or biased to a specific measure of distance.

The method 800 further includes updating at least one of the encoder machine-learning network or the decoder machine-learning network based on the first measure of distance, the second measure, and the third measure of distance (810). This updating process 810 may expand the updating process 516 or the method 600 described above. For example, at least one of the encoder machine-learning network or the decoder machine-learning network are updated using (i) the first measure of distance, (ii) the third measure of distance, which are determined from the plurality of outputs of the learned RF processing module, and (iii) the second measure of distance that represents a difference between the first information and the second information.

In some implementations, the updating process 810 determines at least one of a first weight of the encoder machine-learning network or a second weight of the decoder machine-learning network to achieve one or more of (i) a first goal value of the first measure of distance, (ii) a second goal value of the second measure of distance, and (iii) a third goal value of the third measure of distance. In this case, the first, second, and third goal values correspond to a value of an objective function that is within a predetermined range from a minimum of the objective function. For example, when the objective function achieves the value within the predetermined range from the minimum of the objective function, the first, second, and third measures of distance are determined as having been jointly optimized. The updating process 810 may update/set the encoder network to include the first weight and the decoder network to include the second weight.

Figure 9:
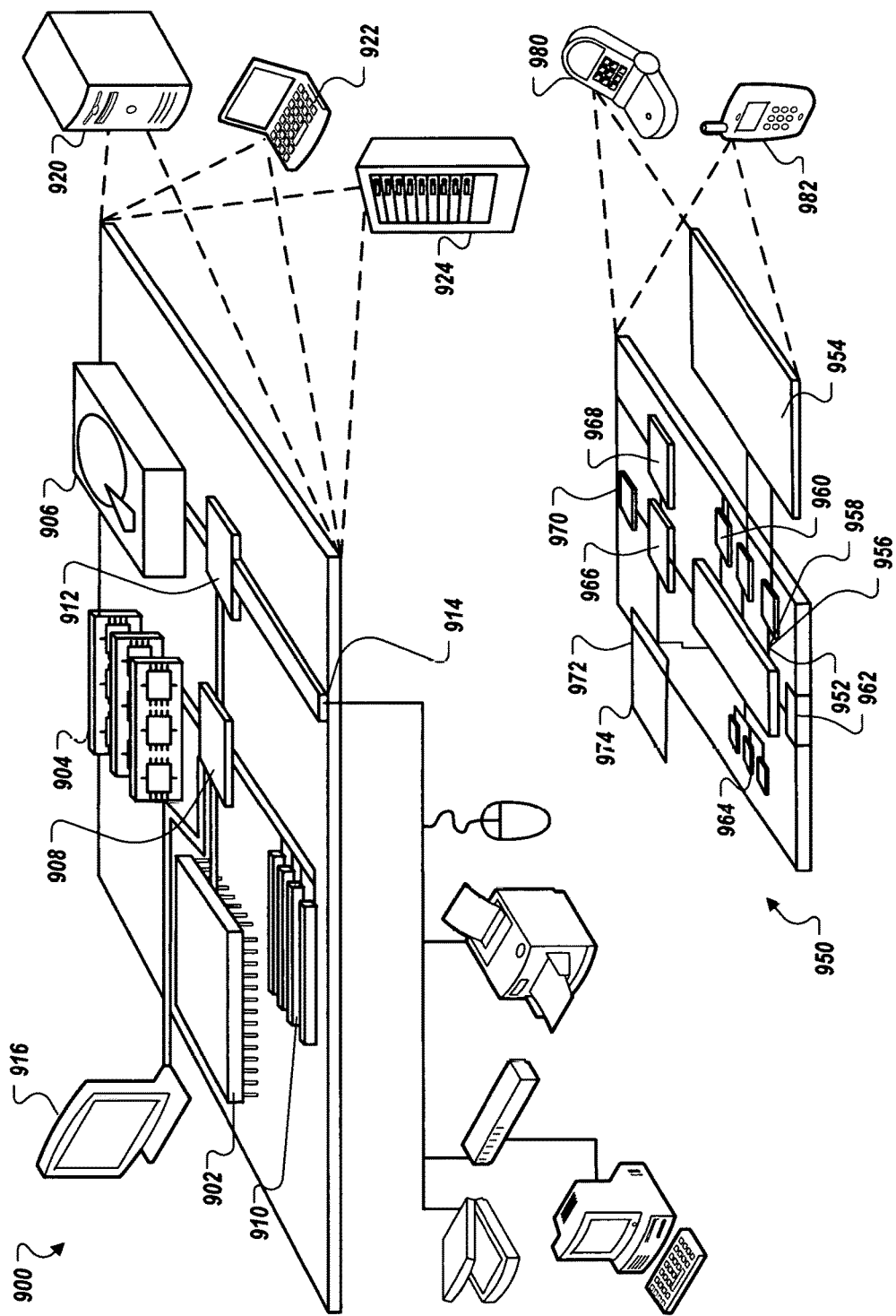
FIG. 9 is a diagram illustrating an example of a computing system that may be used to implement one or more components of a system that performs learned communication over RF channels.

FIG. 9 is a diagram illustrating an example of a computing system that may be used to implement one or more components of a system that performs learned communication over RF channels.

The computing system includes computing device 900 and a mobile computing device 950 that can be used to implement the techniques described herein. For example, one or more parts of an encoder machine-learning network system or a decoder machine-learning network system could be an example of the system described here, such as a computer system implemented in any of the machine-learning networks, devices that access information from the machine-learning networks, or a server that accesses or stores information regarding the encoding and decoding performed by the machine-learning networks.

In some implementations, the computing device 900 corresponds to a radio transmitter, receiver, or transceiver that includes at least one of the encoder network 102 or the decoder network 104 in FIG. 1. In this case, the system 100 of FIG. 1 corresponds to the radio transmitter, receiver, or transceiver. In some examples, the system 100 includes one or more components of the computing device 900, for example, such as a processor 902 or a memory 904. In some implementations, the mobile device 950 corresponds to the system 100 that includes at least one of the encoder network 102 or the decoder network 104 in FIG. 1. In some examples, the system 100 includes one or more components of the mobile device 950, for example, such as a processor 952 or a memory 964.

The computing device 900 is intended to represent various forms of digital computers, such as laptops, desktops, workstations, personal digital assistants, servers, blade servers, mainframes, and other appropriate computers. The mobile computing device 950 is intended to represent various forms of mobile devices, such as personal digital assistants, cellular telephones, smart-phones, cellular base stations, point-to-point or backhaul radios, mobile embedded radio systems, military radios, radio diagnostic computing devices, and other similar computing devices. The components shown here, their connections and relationships, and their functions, are meant to be examples only, and are not meant to be limiting.

The computing device 900 includes a processor 902, a memory 904, a storage device 906, a high-speed interface 908 connecting to the memory 904 and multiple high-speed expansion ports 910, and a low-speed interface 912 connecting to a low-speed expansion port 914 and the storage device 906. Each of the processor 902, the memory 904, the storage device 906, the high-speed interface 908, the high-speed expansion ports 910, and the low-speed interface 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as a display 916 coupled to the high-speed interface 908. In other implementations, multiple processors and/or multiple buses may be used, as appropriate, along with multiple memories and types of memory. In addition, multiple computing devices may be connected, with each device providing portions of the operations (e.g., as a server bank, a group of blade servers, or a multi-processor system). In some implementations, the processor 902 is a single-threaded processor. In some implementations, the processor 902 is a multi-threaded processor. In some implementations, the processor 902 is a quantum computer.

The memory 904 stores information within the computing device 900. In some implementations, the memory 904 is a volatile memory unit or units. In some implementations, the memory 904 is a non-volatile memory unit or units. The memory 904 may also be another form of computer-readable medium, such as a magnetic or optical disk.

The storage device 906 is capable of providing mass storage for the computing device 900. In some implementations, the storage device 906 may be or include a computer-readable medium, such as a floppy disk device, a hard disk device, an optical disk device, or a tape device, a flash memory or other similar solid-state memory device, or an array of devices, including devices in a storage area network or other configurations. Instructions can be stored in an information carrier. The instructions, when executed by one or more processing devices (for example, processor 902), perform one or more methods, such as those described above. The instructions can also be stored by one or more storage devices such as computer- or machine-readable mediums (for example, the memory 904, the storage device 906, or memory on the processor 902). The high-speed interface 908 manages bandwidth-intensive operations for the computing device 900, while the low-speed interface 912 manages lower bandwidth-intensive operations. Such allocation of functions is an example only. In some implementations, the high-speed interface 908 is coupled to the memory 904, the display 916 (e.g., through a graphics processor or accelerator), and to the high-speed expansion ports 910, which may accept various expansion cards (not shown). In the implementation, the low-speed interface 912 is coupled to the storage device 906 and the low-speed expansion port 914. The low-speed expansion port 914, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. In addition, it may be implemented in a personal computer such as a laptop computer 922. It may also be implemented as part of a rack server system 924. Alternatively, components from the computing device 900 may be combined with other components in a mobile device (not shown), such as a mobile computing device 950. Each of such devices may include one or more of the computing device 900 and the mobile computing device 950, and an entire system may be made up of multiple computing devices communicating with each other.

The mobile computing device 950 includes a processor 952, a memory 964, an input/output device such as a display 954, a communication interface 966, and a transceiver 968, among other components. The mobile computing device 950 may also be provided with a storage device, such as a micro-drive or other device, to provide additional storage. Each of the processor 952, the memory 964, the display 954, the communication interface 966, and the transceiver 968, are interconnected using various buses, and several of the components may be mounted on a common motherboard or in other manners as appropriate.

The processor 952 can execute instructions within the mobile computing device 950, including instructions stored in the memory 964. The processor 952 may be implemented as a chipset of chips that include separate and multiple analog and digital processors. The processor 952 may provide, for example, for coordination of the other components of the mobile computing device 950, such as control of user interfaces, applications run by the mobile computing device 950, and wireless communication by the mobile computing device 950.

The processor 952 may communicate with a user through a control interface 958 and a display interface 956 coupled to the display 954. The display 954 may be, for example, a TFT (Thin-Film-Transistor Liquid Crystal Display) display or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may provide communication with the processor 952, so as to enable near area communication of the mobile computing device 950 with other devices. The external interface 962 may provide, for example, for wired communication in some implementations, or for wireless communication in other implementations, and multiple interfaces may also be used.

The memory 964 stores information within the mobile computing device 950. The memory 964 can be implemented as one or more of a computer-readable medium or media, a volatile memory unit or units, or a non-volatile memory unit or units. An expansion memory 974 may also be provided and connected to the mobile computing device 950 through an expansion interface 972, which may include, for example, a SIMM (Single In Line Memory Module) card interface. The expansion memory 974 may provide extra storage space for the mobile computing device 950, or may also store applications or other information for the mobile computing device 950. Specifically, the expansion memory 974 may include instructions to carry out or supplement the processes described above, and may include secure information also. Thus, for example, the expansion memory 974 may be provide as a security module for the mobile computing device 950, and may be programmed with instructions that permit secure use of the mobile computing device 950. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier such that the instructions, when executed by one or more processing devices (for example, processor 952), perform one or more methods, such as those described above. The instructions can also be stored by one or more storage devices, such as one or more computer- or machine-readable mediums (for example, the memory 964, the expansion memory 974, or memory on the processor 952). In some implementations, the instructions can be received in a propagated signal, for example, over the transceiver 968 or the external interface 962.

The mobile computing device 950 may communicate wirelessly through the communication interface 966, which may include digital signal processing circuitry where useful. The communication interface 966 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), LTE, 5G/6G cellular, among others. Such communication may occur, for example, through the transceiver 968 using a radio frequency. In addition, short-range communication may occur, such as using a Bluetooth, Wi-Fi, or other such transceiver (not shown). In addition, a GPS (Global Positioning System) receiver module 970 may provide additional navigation- and location-related wireless data to the mobile computing device 950, which may be used as appropriate by applications running on the mobile computing device 950.

The mobile computing device 950 may also communicate audibly using an audio codec 960, which may receive spoken information from a user and convert it to usable digital information. The audio codec 960 may likewise generate audible sound for a user, such as through a speaker, e.g., in a handset of the mobile computing device 950. Such sound may include sound from voice telephone calls, may include recorded sound (e.g., voice messages, music files, etc.) and may also include sound generated by applications operating on the mobile computing device 950.

The mobile computing device 950 may be implemented in a number of different forms, as shown in the figure. For example, it may be implemented as a cellular telephone 980. It may also be implemented as part of a smart-phone 982, personal digital assistant, or other similar mobile device.

The term "system" as used in this disclosure may encompass all apparatus, devices, and machines for processing data, including by way of example a programmable processor, a computer, or multiple processors or computers. A processing system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, executable logic, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Computer readable media suitable for storing computer program instructions and data include all forms of non-volatile or volatile memory, media and memory devices, including by way of example semiconductor memory devices, e.g., EPROM, EEPROM, and flash memory devices; magnetic disks, e.g., internal hard disks or removable disks or magnetic tapes; magneto optical disks; and CD-ROM and DVD-ROM disks. The processor and the memory can be supplemented by, or incorporated in, special purpose logic circuitry. Sometimes a server is a general-purpose computer, and sometimes it is a custom-tailored special purpose electronic device, and sometimes it is a combination of these things.

Implementations can include a back end component, e.g., a data server, or a middleware component, e.g., an application server, or a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

While this disclosure contains many specific implementation details, these should not be construed as limitations on the scope of any invention or of what may be claimed, but rather as descriptions of features that may be specific to particular implementations of particular inventions. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

What is claimed is:

1. A method performed by one or more processor configured to train one or more machine-learning networks to process information transmitted through a communication channel, the method comprising:

determining first information for transmission through a communication channel;

generating a first RF signal for transmission through the communication channel by processing the first information using an encoder machine-learning network;

determining a second RF signal that represents the first RF signal having been altered by transmission through the communication channel;

determining a first property of at least one of the first RF signal or the second RF signal;

calculating a first measure of distance between a target value of the first property and an actual value of at least one of the first RF signal or the second RF signal;

generating second information as a reconstruction of the first information by processing the second RF signal using a decoder machine-learning network;

calculating a second measure of distance between the first information and the second information; and updating at least one of the encoder machine-learning network or the decoder machine-learning network based on (i) the first measure of distance between the actual value and the target value of the first property and (ii) the second measure of distance between the first information and the second information, wherein updating at least one of the encoder machine-learning network or the decoder machine-learning network comprises:

determining an objective function comprising the first measure of distance and the second measure of distance, calculating a rate of change of the objective function relative to variations in at least one of the encoder machine-learning network or the decoder machine-learning network, and determining a goal value of the objective function by using the rate of change of the objective function relative to the variations in at least one of the encoder machine-learning network or the decoder machine-learning network, wherein the goal value corresponds to a value that is within a predetermined range from a minimum of the objective function.

2. The method of claim 1, wherein updating at least one of the encoder machine-learning network or the decoder machine-learning network further comprises determining at least one of a first weight of the encoder machine-learning network or a second weight of the decoder machine-learning network, wherein the first weight or the second weight enables the objective function to achieve the goal value.

3. The method of claim 2, wherein determining at least one of the first weight of the encoder machine-learning network or the second weight of the decoder machine-learning network comprises determining at least one of the first weight of the encoder machine-learning network or the second weight of the decoder machine-learning network to achieve (i) at least one of a first value that is within a predetermined range from a maximum value or a minimum value of the first measure of distance and (ii) a second value that is within a predetermined range from a minimum value of the second measure of distance.

4. The method of claim 1, wherein the updating results in a value of the first measure of distance below or above a first predetermined threshold, and a value of the second measure of distance below a second predetermined threshold.

5. The method of claim 1, wherein the first property comprises a target spectral shape of at least one of the first RF signal or the second RF signal, and wherein calculating the first measure of distance comprises determining a shaping distance metric that represents a difference between the target spectral shape and a spectral shape of at least one of the first RF signal or the second RF signal.

6. The method of claim 5, wherein determining the shaping distance metric comprises calculating (i) a summation of squared differences between the spectral shape of the first RF signal and the target spectral shape of the first RF signal, or (ii) a summation of squared differences between the target spectral shape of the first RF signal and a maximum among the spectral shape of the first RF signal and a preset threshold value.

7. The method of claim 1, wherein determining the first property of at least one of the first RF signal or the second RF signal comprises using a known RF processing module to process at least one of the first RF signal or the second RF signal, and wherein calculating the first measure of distance comprises determining an output of at least one of the first RF signal or the second RF signal from the known RF processing module as the first measure of distance.

8. The method of claim 7, wherein the first measure of distance comprises a probability of detection of at least one of (i) a power level of the first RF signal or the second RF signal, (ii) a probability of correct classification of the first RF signal or the second RF signal, (iii) a strength of a moment, correlation, cumulant, or signature of the first RF signal or the second RF signal, (iv) a frequency of the first RF signal or the second RF signal, or (v) a cyclostationary property of the first RF signal or the second RF signal.

9. The method of claim 7, wherein the known RF processing module comprises a learned machine-learning network configured to process at least one of the first RF signal or the second RF signal, and wherein calculating the first measure of distance comprises:

determining a plurality of outputs of at least one of the first RF signal or the second RF signal from the learned machine-learning network, and determining a first output of the plurality of outputs as the first measure of distance and a second output of the plurality of outputs as a third measure of distance that represents a second property of at least one of the first RF signal or the second RF signal, wherein the second property is different from the first property.

10. The method of claim 9, wherein determining the objective function comprising the first measure of distance and the second measure of distance comprises determining a second objective function comprising the first measure of distance, the second measure of distance, and the third measure of distance.

11. The method of claim 10, wherein updating at least one of the encoder machine-learning network or the decoder machine-learning network further comprises determining at least one of a first weight of the encoder machine-learning network or a second weight of the decoder machine-learning network to achieve one or more of (i) a first goal value of the first measure of distance, (ii) a second goal value of the second measure of distance, and (iii) a third goal value of the third measure of distance, and
wherein the first, second, and third goal values correspond to a value of the second objective function that is within a predetermined range from a minimum of the second objective function.

12. The method of claim 1, wherein the second measure of distance between the second information and the first information comprises at least one of (i) a cross-entropy between the second information and the first information, (ii) a geometric distance metric between the second information and the first information, or (iii) an f-divergence between the second information and the first information.

13. The method of claim 1, wherein the communication channel comprises at least one of a radio communication channel, an acoustic communication channel, an optical communication channel, or a simulated model channel corresponding to a radio communication channel, an acoustic communication channel, or an optical communication channel.

14. The method of claim 1, wherein training the at least one machine-learning network comprises one of:
training, using a transmitter device in a communications system that includes the communication channel, the encoder machine-learning network, and the decoder machine-learning network, or
training, using a receiver device in the communications system, the encoder machine-learning network, and the decoder machine-learning network.

15. A non-transitory computer-readable storage medium having stored thereon instructions which, when executed by at least one processor, cause performance of operations comprising:
determining first information for transmission through a communication channel;
generating a first RF signal for transmission through the communication channel by processing the first information using an encoder machine-learning network;
determining a second RF signal that represents the first RF signal having been altered by transmission through the communication channel;
determining a first property of at least one of the first RF signal or the second RF signal;
calculating a first measure of distance between a target value of the first property and an actual value of at least one of the first RF signal or the second RF signal;
generating second information as a reconstruction of the first information by processing the second RF signal using a decoder machine-learning network;
calculating a second measure of distance between the first information and the second information; and
updating at least one of the encoder machine-learning network or the decoder machine-learning network based on (i) the first measure of distance between the actual value and the target value of the first property and (ii) the second measure of distance between the first information and the second information,
wherein updating at least one of the encoder machine-learning network or the decoder machine-learning network comprises:
determining an objective function comprising the first measure of distance and the second measure of distance,
calculating a rate of change of the objective function relative to variations in at least one of the encoder machine-learning network or the decoder machine-learning network, and
determining a goal value of the objective function by using the rate of change of the objective function relative to the variations in at least one of the encoder machine-learning network or the decoder machine-learning network, wherein the goal value corresponds to a value that is within a predetermined range from a minimum of the objective function.

16. The non-transitory computer-readable storage medium storage medium of claim 15, wherein determining the first property of at least one of the first RF signal or the second RF signal comprises using a known RF processing module to process at least one of the first RF signal or the second RF signal, and
wherein calculating the first measure of distance comprises determining an output of at least one of the first RF signal or the second RF signal from the known RF processing module as the first measure of distance.

17. The non-transitory computer-readable storage medium storage medium of claim 16, wherein the known RF processing module comprises a learned machine-learning network configured to process at least one of the first RF signal or the second RF signal, and
wherein calculating the first measure of distance comprises:
determining a plurality of outputs of at least one of the first RF signal or the second RF signal from the learned machine-learning network, and
determining a first output of the plurality of outputs as the first measure of distance and a second output of the plurality of outputs as a third measure of distance that represents a second property of the first RF signal, wherein the second property is different from the first property of the first or second RF signal.

18. A system comprising:
at least one processor; and
at least one computer memory that is operably connectable to the at least one processor and that has stored thereon instructions which, when executed by the at least one processor, cause the at least one processor to perform operations comprising:
determining first information for transmission through a communication channel;
generating a first RF signal for transmission through the communication channel by processing the first information using an encoder machine-learning network;
determining a second RF signal that represents the first RF signal having been altered by transmission through the communication channel;
determining a first property of at least one of the first RF signal or the second RF signal;
calculating a first measure of distance between a target value of the first property and an actual value of at least one of the first RF signal or the second RF signal;

generating second information as a reconstruction of the first information by processing the second RF signal using a decoder machine-learning network;

calculating a second measure of distance between the first information and the second information; and updating at least one of the encoder machine-learning network or the decoder machine-learning network based on (i) the first measure of distance between the actual value and the target value of the first property and (ii) the second measure of distance between the first information and the second information, wherein updating at least one of the encoder machine-learning network or the decoder machine-learning network comprises:

determining an objective function comprising the first measure of distance and the second measure of distance, calculating a rate of change of the objective function relative to variations in at least one of the encoder machine-learning network or the decoder machine-learning network, and determining a goal value of the objective function by using the rate of change of the objective function relative to the variations in at least one of the encoder machine-learning network or the decoder machine-learning network, wherein the goal value corresponds to a value that is within a predetermined range from a minimum of the objective function.

19. The system of claim 18, wherein determining the first property of at least one of the first RF signal or the second RF signal comprises using a known RF processing module to process at least one of the first RF signal or the second RF signal, and wherein calculating the first measure of distance comprises determining an output of at least one of the first RF signal or the second RF signal from the known RF processing module as the first measure of distance.

20. The system of claim 19, wherein the known RF processing module comprises a learned machine-learning network configured to process at least one of the first RF signal or the second RF signal, and wherein calculating the first measure of distance comprises:

determining a plurality of outputs of at least one of the first RF signal or the second RF signal from the learned machine-learning network, and determining a first output of the plurality of outputs as the first measure of distance and a second output of the plurality of outputs as a third measure of distance that represents a second property of the first RF signal, wherein the second property is different from the first property of the first or second RF signal.

* * * * *

UNITED STATES PATENT AND TRADEMARK OFFICE
CERTIFICATE OF CORRECTION

PATENT NO. : 10,429,486 B1
APPLICATION NO. : 15/998986
DATED : October 1, 2019
INVENTOR(S) : Timothy James O'Shea, James Shea and Ben Hilburn It is certified that error appears in the above-identified patent and that said Letters Patent is hereby corrected as shown below:

In the Claims

Column 30, Lines 21-22, In Claim 16, delete "storage medium storage medium" and insert -- storage medium --, therefor.

Column 30, Lines 31-32, In Claim 17, delete "storage medium storage medium" and insert -- storage medium --, therefor.

Signed and Sealed this
Third Day of December, 2019

Andrei Iancu
*Director of the United States Patent and Trademark Office*